Jan. 6, 1953     C. E. SEAGREN     2,624,294
APPARATUS FOR MAKING THREE-DIMENSIONAL ORNAMENTAL
UNITS IN THE NATURE OF DECALCOMANIA
Filed Sept. 24, 1948     5 Sheets-Sheet 1
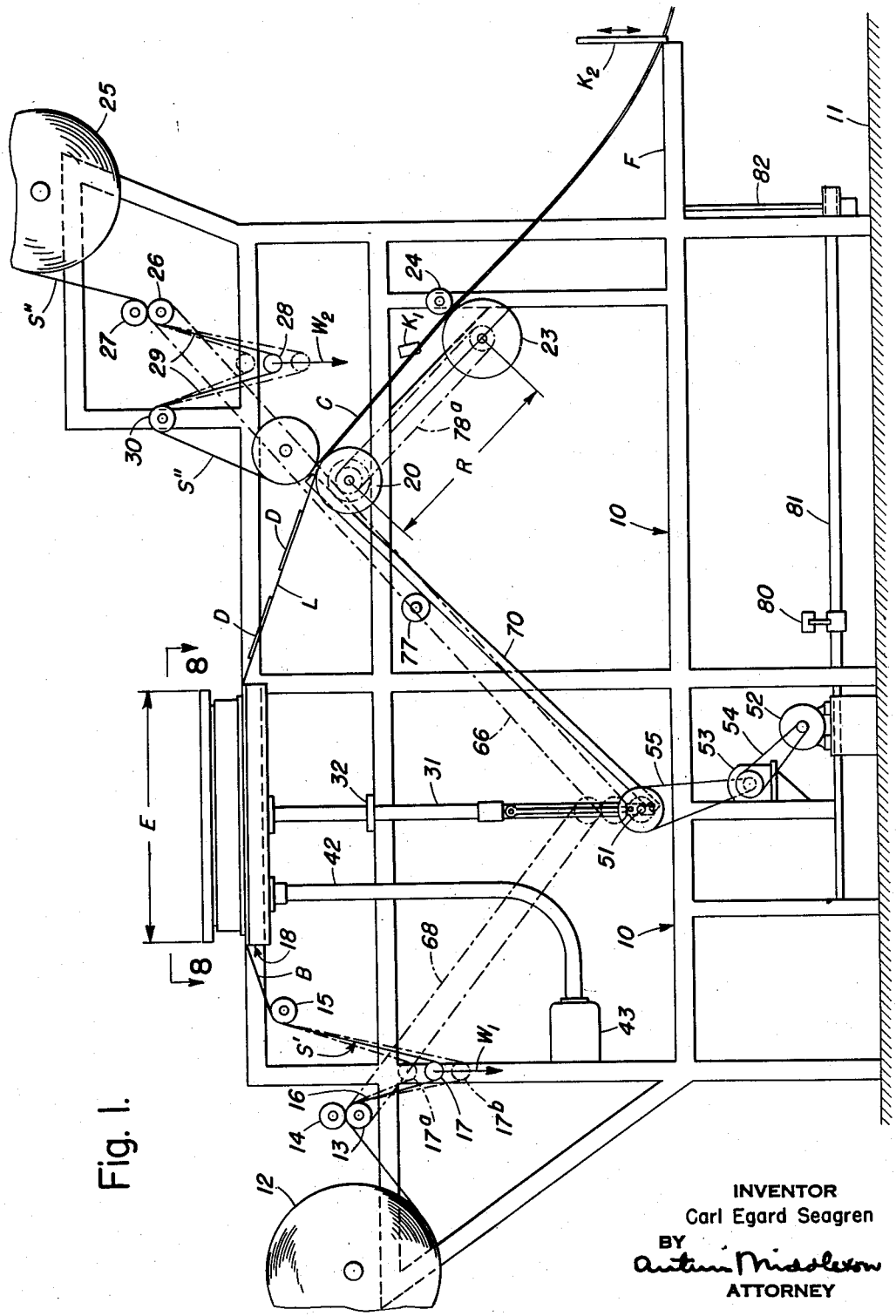
Fig. I.
INVENTOR
Carl Egard Seagren
BY
Arthur Middleton
ATTORNEY

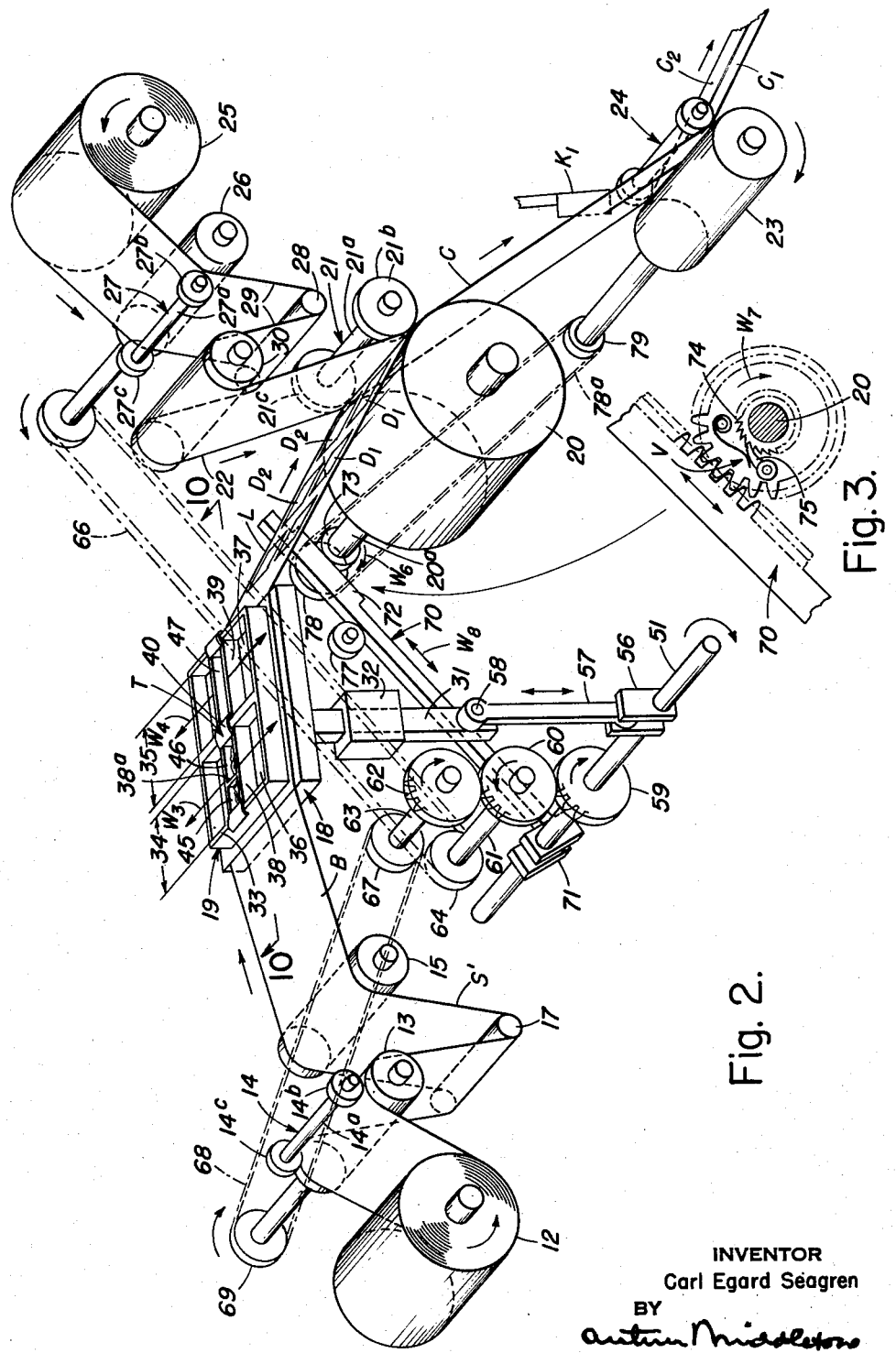

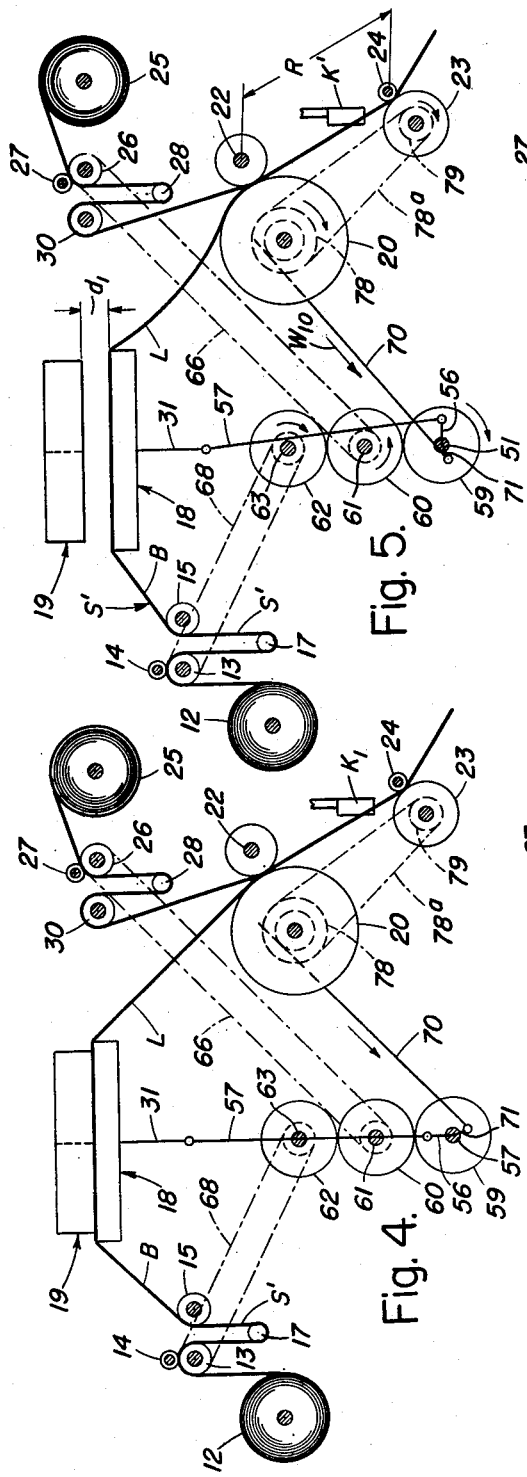
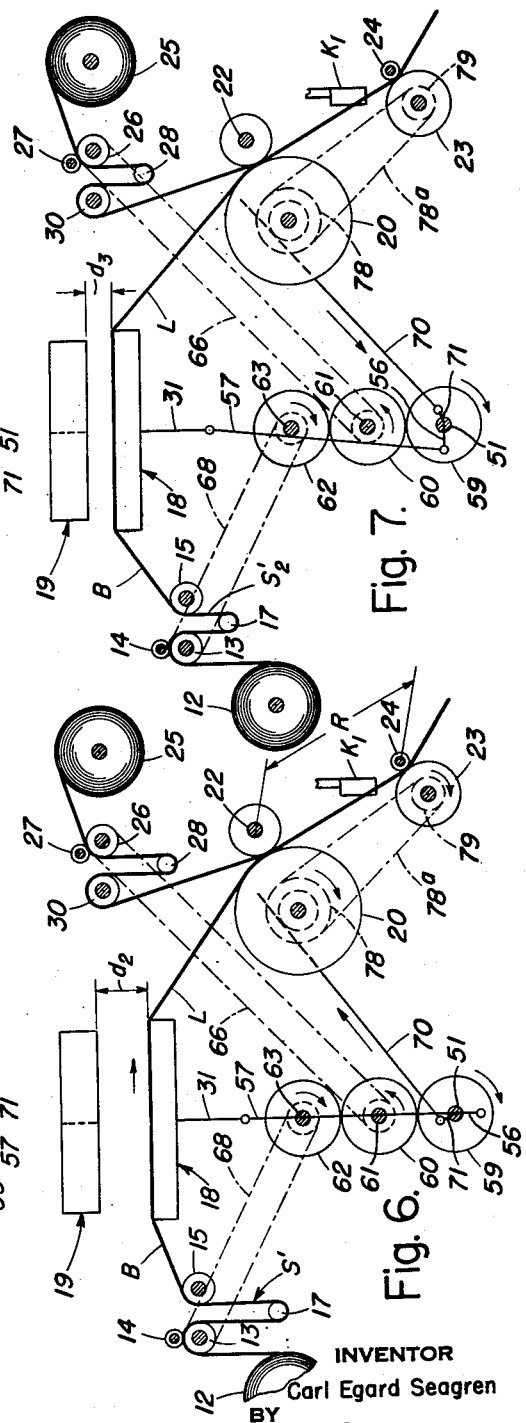

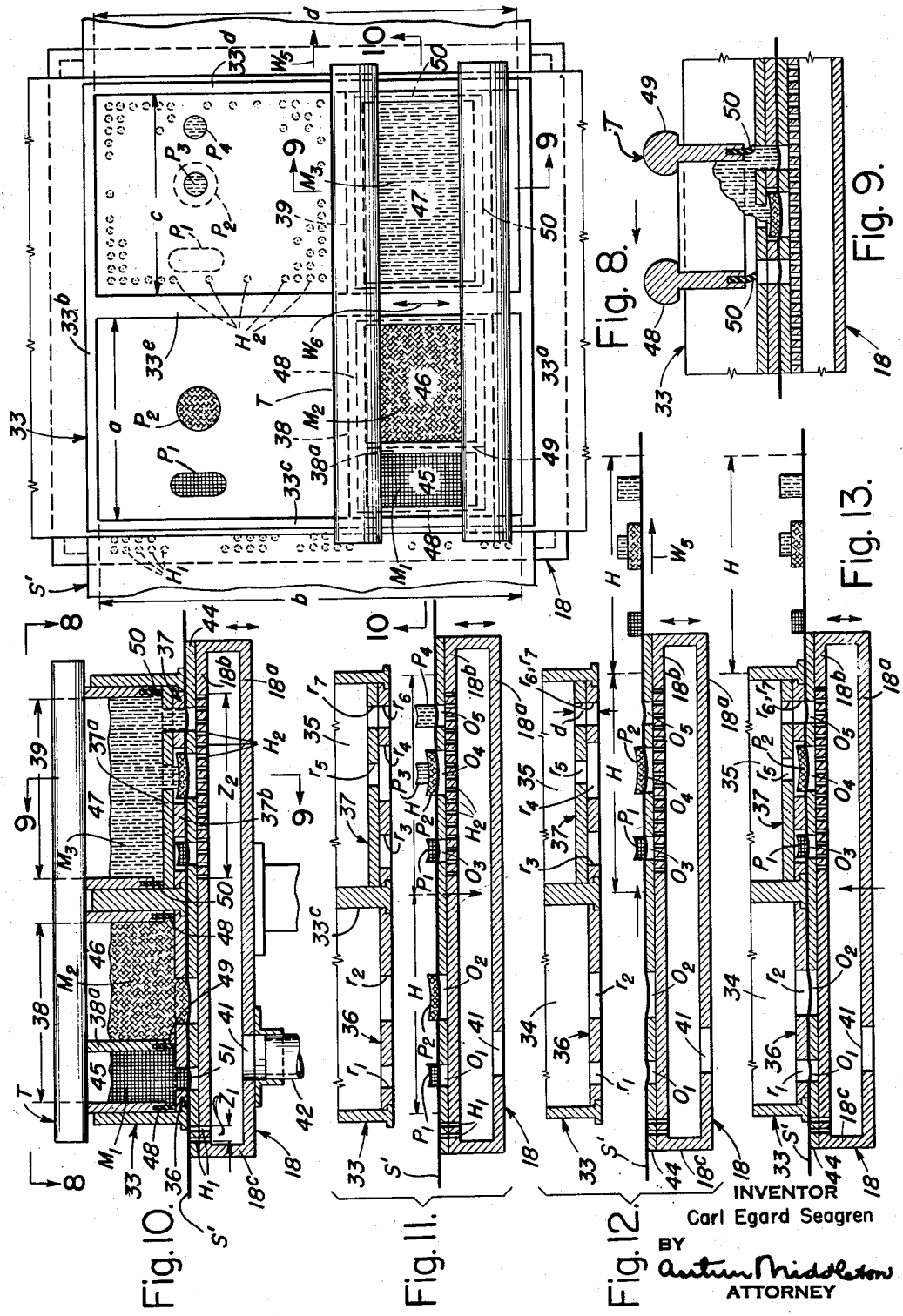

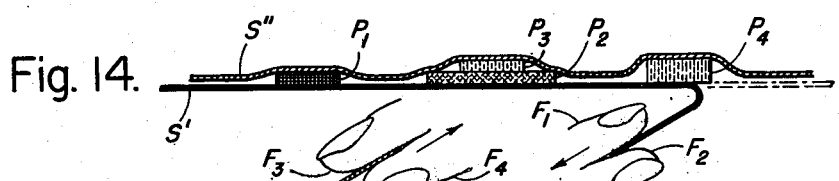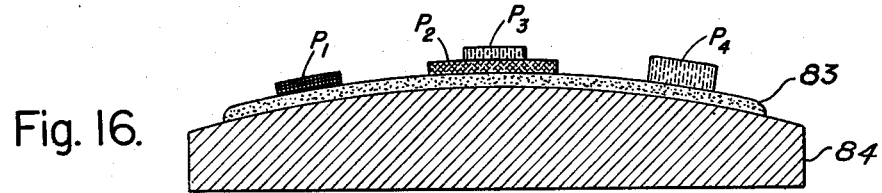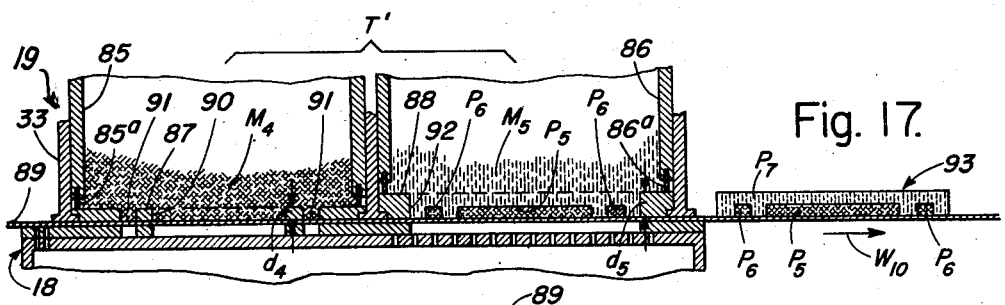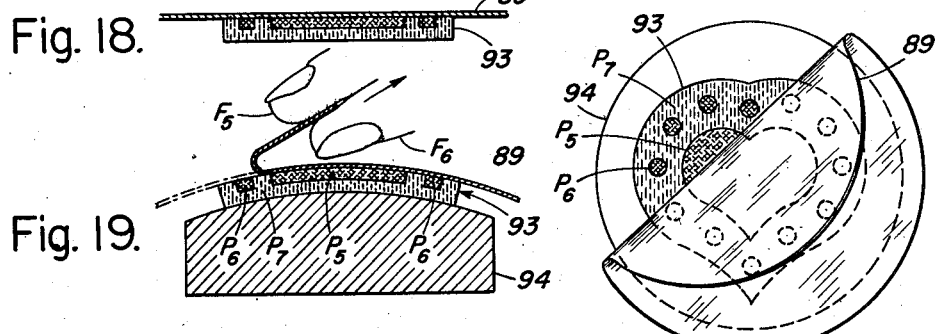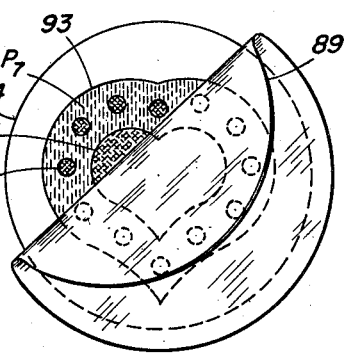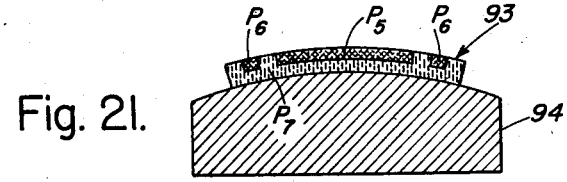

Patented Jan. 6, 1953

2,624,294

UNITED STATES PATENT OFFICE 2,624,294

APPARATUS FOR MAKING THREE-DIMENSIONAL ORNAMENTAL UNITS IN THE NATURE OF DECALCOMANIA

Carl Egard Seagren, Brooklyn, N. Y., assignor to Carl Seagren Enterprises, Brooklyn, N. Y., a copartnership Application September 24, 1948, Serial No. 50,972

8 Claims. (Cl. 107—1)

This invention relates to the making mechanically of ornamental but edible three dimensional decorations or designs or design-carrying units suitable for subsequent direct application onto edible products such as cakes or candy.

Cakes are now decorated by hand and the decoration usually comprises the application to the top of the cake of a background layer of edible sugary material or icing, so-called because of its ice-simulating appearance, and applied to the face of the icing the design or decoration proper which may consist of component portions of varicolored sugary or gelatinous edible material. In present practice the icing layer and then the design thereon are applied sequentially to the cake.

It is one of the objects of this invention to produce such decorations by machinery rapidly and economically, that is to produce machine-made decorating units in the nature of decalcomanias for application as such to the top of the cake, and to devise machinery for producing such units. That is to say, the product or decalcomania delivered by such a machine comprises a transfer sheet to which adheres the edible material constituting the design with the top face of the design contiguous and adhering to the sheet while the back of the design faces away from the sheet. Such a unit is applied to the top face of the cake or to the icing layer thereon with sufficient firmness to allow the design to adhere to the cake while allowing the transfer sheet which is now on top to be pulled off leaving the design on the cake.

Another object is to devise such a machine that is capable of producing designs embodying optional varieties of combinations of varicolored component portions by building up the design as it passes through a sequence of formative stages in the machine. That is to say, the machine according to this invention is capable of producing designs of various basic characteristics of composition, for instance one in which component portions which may be of contrasting colors are positioned in the same plane where they may adjoin one another to compose a varicolored object or figure or where they may be spaced from one another as, for example, a pair of figures, all component portions adhering directly to the transfer sheet. In another characteristic composition one component portion may be superimposed upon another which in turn adheres to the transfer sheet, which arrangement is herein called an overlay. In still another composition one component portion may be inserted into or surrounded or enveloped by another portion which in turn adheres to the transfer sheet, which arrangement is herein called an inlay.

Still another object is to devise or establish as products composition patterns providing a variety of modes of combining the component parts of the design producible in stages. One representative or characteristic composition in such a product comprises a component portion of the design composed with or added onto another component portion in the same planar relationship, that is in a relationship where both component portions assume their inter-relationship within the design by directly adhering to the transfer sheet, in which case the component portions may be either laterally contiguous or laterally spaced with respect to one another. In another representative or characteristic composition of such a product one component portion of the design is superimposed upon and therefore raised above and adheres to another component portion which in turn adheres to the transfer sheet. In still another representative or characteristic composition of such a product one component portion of the design is embedded in or surrounded or encompassed by another or basic component portion which in turn adheres to the transfer sheet.

The above first- and second-mentioned composition of the product of such a machine may be embodied in a decalcomania in which the edible material adhering to the transfer sheet is in the nature of non-crystallizable and non-hardening material although of suitable consistency. A protective sheet (for certain reasons herein also called the backing sheet) may be provided to adhere to and protect the back face of the design so that this sheet can be pulled off the back of the design when the decalcomania is to be readied by the user for application to the iced layer of a cake.

The above third-mentioned composition of the product producible by such a machine may be embodied in a decalcomania in which a component portion of edible material is embedded in a basic component portion or edible disc or base of contrasting color. In this way the first component portion presents a silhouette or the like embedded in and substantially flush with the face of the base or disc which latter represents a contrasting background for that silhouette. To the face of this "monolithic" design adheres the transfer sheet upon which this design has been formed. The exposed back face of this design may be applied to or impressed upon the top of the cake so that it will adhere thereto sufficiently to allow the transfer sheet to be pulled off when desired.

It is one phase of this invention that the surface characteristic of the transfer sheet is such that its adhesiveness relative to the edible design of the material is less than the adhesiveness of the material relative to the top face of the cake or of the icing layer thereon.

At least some of the foregoing objects are attainable by a machine wherein a continuous strip or sheet passes stepwise through an applicator device, the progress of the strip being controlled to pause long enough between steps to have the contrasting edible materials applied to it by a sequence of design-forming templates. The strip emerges stepwise from the applicator device bearing a plurality of identical but composite designs which may be severed from one another by cutting the strip, each severed section of the strip thus representing a specimen of the decalcomania.

The operation of the machine and the arrangement of the templates may be such that the strip moving through the applicator device in step-by-step manner pauses between steps to have applied thereto portions of the design in a face-down or upside-down manner.

For example, when a portion of the strip pauses in the first stage or section of the applicator device it may have applied a first shaped layer or component portion of ornamental coating; then after the strip has advanced another step it may have applied a second shaped layer or component portion of ornamental coating of a different color or kind. The second layer or portion may be alongside the first layer or portion so that both adhere directly to the strip or sheet; or a part of the second layer may overlie the first layer so that at least a part of the first layer becomes embedded in the second layer, whereby the faces of both layers become co-planar or flush with respect to each other, or the first constitutes an inlay in the second layer.

The machine comprises a flat platen associated with or in the nature of a vacuum suction box over which the strip passes or slides while being held flatly thereagainst due to the suction thereon. An actuating mechanism is operable at will to move into operative relationship the platen and each design-applying template which is part of the applicator device, preferably by raising the platen with the strip into contact with the template or lowering it away therefrom, the strip moving up and down with the platen due to suction which holds it thereagainst. While in its lowered position, the strip is advanced a predetermined distance or step, namely the length of the intended individual decalcomania. The operation is or may be rendered automatic if desired in so far as the up-and-down movement of the platen is concerned and timed with the stepwise advance of the strip. That is, a master drive element can be used that reciprocates the platen and controls branch drive means to actuate friction rollers to feed the strip effecting the stepwise advance thereof at the proper time.

An important feature lies in the applicator device in which diverse component portions of the composite design are produced in a plurality of stages, that is through a plurality or sequence of templates each of which produces one component of the composite design, and whereby portions of the design can be superimposed upon previously applied portions, while portions applied in an earlier stage can be blanked off and protected in a subsequent stage. Also, the portions of the design thus applied in sequence may differ from each other with respect to the color of the material thus stagewise applied.

With respect to the operation of the applicator, a feature also lies in the provision of a movable fountain or container holding a supply in paste form of the edible material to be applied through a template to the transfer sheet. Such a fountain or supply container is slidable between guides horizontally over the template and has a suitable slot-like discharge opening provided with a squeegee for gently forcing the discharging paste into the template while wiping off surplus. One or more strokes of the fountain forces an adequate amount of paste through the template onto the sheet to which it adheres when the sheet with the platen is lowered preliminary to stepwise advance of the sheet.

Various features of the invention lie in details of the drive mechanism of the machine. For example, one of the features lies in providing an automatic one-revolution mechanism or clutch in the drive mechanism which will automatically disconnect or uncouple the drive motor of the mechanism after an operating cycle of the machine is completed. That is, the motor is started to initiate each operating cycle, but the machine stops automatically at the end of the cycle, namely at the point where a new application by the operator of the edible design material through the template or templates is required. In this way the operator's only function after he has completed an application is to connect or couple the motor as by foot pedal, wait until the machine has completed its cycle and stops due to uncoupling of the motor, and then to make another application, and so on in coordination with the stepwise automatic advancement of the strip incident to each cycle.

Other features lie in the manner of composition of the component portions of the edible design or decalcomania or product.

According to one feature the product comprises component portions or shaped layers of gelatinous edible nature which is non-crystallizing or nonhardening although of a suitable viscosity. Such portions may be of different colors and they may be disposed side-by-side and directly adhering to the transfer sheet or the one may be superimposed upon and partially overlie and adhere to the other which latter in turn adheres to the transfer sheet.

According to another feature the product comprises in principle a first component portion or shaped layer of edible material. This is embedded or constitutes an inlay in a second component portion or shaped layer of different color. Thus the faces of both portions are substantially co-planar and the "inlay" represents a silhouette against the second layer that represents a background. More specifically, the first or inlay portion is of gelatinous non-crystallizable edible material of glossy surface, while the second portion is of sugar-bearing crystallizable material appearing non-glossy. In this way the effect of contrast between the inlay portion and the second or background portion is enhanced.

The sugar-bearing non-glossy material of the base portion may be such that the non-crystalline glossy inlay material sets off its eye-catching shape and color against the contrastingly colored background of the sugar-bearing material. By way of example, the crystalline non-glossy sugar background can be orange color and the glossy gelatine portion may be the silhouette in black color of a witch. This makes an attractive decoration for Halloween. In another example the crystalline sugar background may be white and have embedded in it a heart-shaped inlay portion of red-colored gelatinous material. This makes an attractive design for St. Valentine's day. Or, the white background may have inlay lettering such as "Happy Birthday" in blue or green or red or some combination of colors.

According to still another feature of the product the edible material is applied to a transfer sheet that is in the nature of plastic film or non-fibrous glossy-surfaced sheeting, for example acetate, and it may be transparent. The surface characteristic of such sheeting with respect to this invention is that the edible material adheres to the sheeting only to the extent that it can be peeled off the material readily after application of the unit to the cake.

In the drawings:

Fig. 1 is a somewhat schematic side view of the machine.

Fig. 2 is a perspective view of the operating parts of the mechanism of the machine as far as they illustrate the functioning of the machine.

Fig. 3 is an enlarged detail view of certain drive elements from Fig. 2.

Figs. 4 to 7 are diagrammatic views of the mechanism, presenting sequential stages of the operating cycle.

Fig. 8 is an enlarged plan view of the applicator device taken on line 8—8 in Fig. 1.

Fig. 9 is a part-sectional cross-section taken on line 9—9 in Fig. 8.

Fig. 10 is a cross-sectional view of the applicator device taken on line 10—10 of Fig. 8.

Figs. 11 to 13 show operational stages in the operating cycle of the applicator device, that is various characteristic operating positions of the platen and of the transfer strip.

Fig. 14 is a schematic vertical sectional view of one embodiment of a three-dimensional ornamental unit of decalcomania exemplifying "overlay" composition of the edible material.

Fig. 15 illustrates the unit of Fig. 14 in the process of application.

Fig. 16 shows the unit of Fig. 14 as applied.

Fig. 17 illustrates schematically the manner of producing another embodiment of an ornamental unit of three-dimensional decalcomania by the machine, that embodiment exemplifying "inlay" composition of the edible material.

Fig. 18 shows the unit produced according to the Fig. 17 operation and in position for application.

Fig. 19 illustrates the unit of Fig. 18 in the process of being applied to a cake.

Fig. 20 is a top view of Fig. 19.

Fig. 21 shows the unit of Fig. 18 as applied.

In Fig. 1 the machine is diagrammatically shown to comprise a machine frame 10 rising from a base 11, which frame carries the operating parts and mechanism of the machine.

The backing strip designated as S' is supplied by and drawn in stepwise fashion from a supply roll 12 which is rotatably mounted upon one end of the machine frame 10. The strip S' passes between and is gripped by auxiliary friction feed rollers 13 and 14, roller 14 being an idler while roller 13 is driven stepwise from a master drive and in a manner to be described below. From between these feed rollers, the strip S' passes over a guide roller 15 although providing a variable reserve length in the form of an open loop 16 which is weighted down by a floating or compensating roller 17 which rises and falls with variations in the length of the loop and thereby absorbs or compensates for certain fluctuations, discrepancies or differentials in the rates of feed of various portions of the strip proceeding through the machine, as will be further explained below. The floating character of the roller 17 and its weight or compensating function are illustrated by an arrow $W_1$ indicating the downward pull of the weight, as well as by an upper and a lower dot-and-dash line position $17^a$ and $17^b$ of the floating roller or weight 17.

From the guide roller 15 which is journalled upon the machine frame 10 the strip S' passes over a flat platen or suction box 18, to which the strip is normally although slidably held by suction. The platen 18 is vertically reciprocable for a short stroke relative to an applicator device 19 mounted directly above it and mounted upon the machine frame 10, so that the strip adhering to the platen by suction can be moved up and down, that is, into and out of flat facewise engagement with the applicator device.

The progress of the strip S' through the machine, as will be explained further below, is stepwise in synchronism with the vertical up-and-down movement of the platen 18 so that the strip may have applied to it a succession of identical edible designs. That is to say, the strip advances a predetermined distance while the platen 18 is in its lowered position whereby a fresh blank portion of the strip is placed upon the platen and underneath the applicator device. The platen is then raised so as to raise the strip into contact with the applicator device in order that it may have the edible design applied to it from the device. This done the platen is lowered to allow for renewed stepwise progress of the strip carrying the freshly applied design to a point beyond the applicator while positioning a subsequent blank portion of the strip to receive another application from the applicator device and so on.

The portion of the machine, comprising the platen 18 and the applicator device 19, through which the strip must pass, is herein termed the applicator stage and is designated as E. The portion of strip S' entering the applicator stage E is herein called the blank strip B, whereas the portion of the strip leaving the applicator stage is herein called the loaded strip L because of the fact that it has had the edible designs applied to it a series of which designs are indicated at D (see Fig. 1). Indeed the construction of the applicator device 19 in this embodiment is such that a pair of designs are placed side by side upon the strip by a single operation or manipulation of that device, such pairs of designs being indicated at $D_1$ and $D_2$ in Fig. 2.

The loaded strip L passes from the applicator stage E to a pair of main feed friction rollers 20 and 21 of which the roller 21 is an idler while the roller 20 is driven from the master drive aforementioned but described further below. Entering between these main feed rollers the loaded strip is joined tangentially by a transfer strip S" which thus overlies and contacts as well as adheres to the edible designs on the loaded strip L. Hence, there emerges from between the rollers 20 and 21 that portion of the strip which is herein called the finished or composite strip C which passes on to a pair of friction feed rollers 23 and 24 of which roller 24 is an idler while roller 23 is driven from the master drive. Since the driven roller 23 feeds the composite strip at the same rate as the driven roller 20, there is thus maintained between the pair of rollers 20 and 21 and the pair of rollers 23 and 24 a straight length R of the composite strip. Interposed in the space R is a stationary slitting knife $K_1$ which cuts and subdivides the strip longitudinally into a pair of strips $C_1$ and $C_2$ (see Fig. 2) each such divisional strip carrying a series of the designs $D_1$ and $D_2$ respectively.

The composite strip thus slitted passes from between the rollers 23 and 24 to a platform or cutting table F formed by or upon the machine frame 10 where a vertically movable or swingable chopping knife $K_2$ is operable at will or in coordination with the stepwise feed of the strip through the machine. Thus the chopping knife $K_2$ further cuts the divisional strips $C_1$ and $C_2$ transversely into squares each of which represents an individual specimen of the edible design in the nature of a decalcomania.

The transfer strip S'' which may be in the nature of very thin film-like transparent material such as plastic is drawn by the main feed rollers 20 and 21 from a supply roll 25 which is journalled upon the machine frame 10. That is, the transfer strip S'' passes from the supply roll 25 to a pair of auxiliary feed friction rollers 26 and 27 of which roller 27 is an idler while roller 26 is driven from the master drive, both rollers being journalled upon the machine frame 10. The transfer S'' emerges from between these feed rollers to pass downwardly and under a bodily floating or compensating roller 28 which as to function and purpose is similar to the compensating roller 17 at the feed end of the strip above described. That is, the transfer strip S'' thus forms a compensating length such as the loop 29 as it passes upwardly from the roller 28 to and over a guide roller 30 which is journalled upon the machine frame 10; thence to pass again downwardly, namely to and under the idler 21 joining the loaded strip L as aforementioned. The compensating function of the floating roller 28, like that of roller 17, is illustrated by an upper and lower dot-and-dash line position $28^a$ and $28^b$ as well as by a weight indicating arrow $W_2$.

It will be noted that in advancing past the various pairs of feed rollers the backing strips S' and the transfer strip S'' as well as the composite strip C are frictionally engaged only at their margins by the respective idlers 14, 21 and 27. That is to say the idler 14 actually comprises a shaft $14^a$ with narrow rollers $14^b$ and $14^c$ fixed to the ends of the shaft. Similarly, the idler 21 comprises a shaft $21^a$ unitary with narrow rollers $21^b$ and $21^c$ at each respective end thereof, while the idler 27 comprises a shaft $27^a$ with narrow rollers $27^b$ and $27^c$ fixed thereon.

It will be understood that in the making of the composite strip C by this machine the edible material is applied to the strip through templates in the form of a paste or in sufficiently viscous condition, but hardens to a degree during its stepwise advance through the machine. Indeed the material acquires a partially hardened condition by the time it reaches the rollers 20 and 21 where the transfer strip S'' is applied which in turn adheres to the partially hardened material of the design.

There will now be described in greater detail the construction and function of the applicator stage E, that is of the platen 18 and the applicator device 19, as well as the drive mechanism for effecting the controlled and measured stepwise advance of the strip through the machine in coordination to the operation of the applicator stage.

As for the applicator stage E, the platen 18 is vertically reciprocable by reason of a vertical stem 31 unitary with and extending rigidly from the underside of the platen and vertically slidable in a guide bearing 32. This stem is of square cross-section and the bearing 32 correspondingly shaped secures it against rotation.

The applicator device 19 comprises a horizontally-extending frame structure 33 suitably mounted upon and supported by the machine frame 10. The frame structure 33 constitutes a first compartment or section 34 for applying a first portion or stage of the edible design, and a second compartment or section 35 for applying a section portion or stage of the edible design. The bottom of each compartment 34 and 35 is formed by an exchangeable template 36 and 37 respectively (see Fig. 10) defining the first and the second stage or component portion respectively of the design to be applied to the strip which templates as to their disposition and function will be described in detail further below.

A first or primary fountain or supply container 38 is horizontally slidable back and forth in the direction of arrow $W_3$ within the first compartment 34 for dispensing the edible paste to and into the template 36 in the process of applying the first component portion of the design. A second or secondary fountain or supply container 39 is also horizontally slidable back and forth in the direction of arrow $W_4$ within the second compartment 35 for dispensing the edible paste to and into the template 37 in the process of applying the second component portion of the design. So that both containers 38 and 39 may be moved together to effect simultaneous application of both component portions of the design, they are rigidly interconnected as is indicated by a connecting member 40. In this way both containers constitute a twin fountain unit T which is thus horizontally movable or slidable by the operator upon the applicator frame 33 in a direction transversely of the longitudinal direction of progress of the strip.

Referring more particularly to Figs. 8 to 12, a more detailed description will now be rendered of the structure that represents the applicator stage E, namely, of the movable platen 18 and of the applicator device 19, which except for the movable twin fountain unit T in it is stationary upon the machine frame.

The platen 18 as aforementioned is in the nature of a flat suction box comprising bottom portion $18^a$, a top portion $18^b$, and side wall portion $18^c$. The top portion $18^b$ of the suction box is provided with relatively small suction holes such as the holes $H_1$ comprised in a narrow zone $Z_1$ and the holes $H_2$ comprised in a wider zone $Z_2$. A vacuum or suction maintained in the suction box or platen 18 acts through the suction holes $H_1$ and $H_2$ so as to hold the strip S' engaged flat against although slidable upon the top face of the suction box, that is, in a manner to hold the strip constantly engaged or adhered to the platen and during its up-and-down movement, while allowing it to be advanced as in the direction of arrow $W_5$ at the proper time (see Fig. 12). An opening 41 in the bottom portion of the suction box provides for a connection with a flexible conduit or tube 42 through which suction or a vacuum is applied as by a suction fan or suction unit 43 (see Fig. 1) mounted upon the machine frame 10.

The top face of the suction box 18 is represented in effect by the top face of a plate 44 which overlies and is fastened to the top portion $18^b$ of the suction box 18, and is provided with cut-outs or openings exemplified at $O_1$, $O_2$, $O_3$, $O_4$, $O_5$ which openings register or coact, for example, with certain design forming openings or with recesses provided in the templates 36 and 37. These templates although exchangeable constitute a part of the stationary applicator 19 which together with the templates and the twin fountain unit T will be presently described in greater detail.

The applicator device 19 aforementioned comprises the horizontally-extending frame structure 33 having a front wall $33^a$, a rear wall $33^b$, both extending longitudinally of the strip S', and having side walls $33^c$ and $33^d$ extending transversely of the strip. A partitional wall $33^e$ extending transversely of the strip also forms part of the frame 33 dividing the same into the aforementioned first compartment 34 and the second compartment 35. In Fig. 8 the compartment 34 is moreover defined by the dimensions $a$ and $b$ while the compartment 35 is defined by the dimensions $c$ and $d$.

Horizontally slidable in reciprocating fashion as indicated by arrow $W_6$ is the aforementioned twin fountain unit T for dispensing and applying the edible material to and into the templates 36 and 37. As shown by way of example the movable dispensing unit T is capable of producing a three-color design, because due to a subdivision of the container 38 by a partitional wall $38^a$, it provides three separate dispensing compartments 45, 46, 47 each containing a different color of edible design forming paste designated as $M_1$, $M_2$, and $M_3$ respectively their color distinctions being indicated by contrasting patterns of shading.

The dispensing unit T has been termed above a twin-fountain unit inasmuch as it applies the edible material simultaneously in both stages of the design. Yet the fountain or supply container for each stage may be subdivided into separate compartments each of which may contain a different color material as exemplified by the compartments 45 and 46 of the aforementioned first applicator stage or compartment 34. In effect the dispensing unit T in this instance rather constitutes a three-fountain unit, but for the sake of simplicity and in view of the basically two-stage operation of the applicator device 19 the term twin-fountain or twin-dispensing unit will be adhered to in designating the horizontally slidable unit T.

The horizontally-slidable dispensing unit T comprises the aforementioned primary fountain 38 operating within section 34 of the applicator frame 19, and the secondary fountain 39 operating within the section 35 of the applicator frame. Both fountains 38 and 39 are rigidly interconnected, to form the slidable unit T, by a pair of bar-like members or handle bars 48 and 49 extending parallel to one another as well as parallel to the wall portions $33^a$ and $33^b$ of the applicator frame 33 that is transversely of the sections 34 and 35 thereof. The bars 48 and 49 serve as handles for an operator moving the unit T back and forth as indicated by arrow $W_6$ (in Fig. 8) or by arrows $W_3$ and $W_4$ (in Fig. 2).

The primary fountain or slidable container 38 as herein shown might be defined as a rectangular box having no top or bottom, although closing upon the face of the primary or first-stage template 36 by means of rubber stripping or squeegees 48 providing or constituting the bottom edge of the fountain 38 so that the content of edible paste or viscous material remains confined or sealed off in the fountain by the rubber stripping in spite of the horizontally reciprocating movement to which it is subject when manipulated by the operator. In the present instance the fountain 38 is subdivided by the partitional wall $38^a$ also provided with rubber stripping to constitute the bottom edge as at 49 for sealing the material $M_1$ in compartment 45 against the material $M_2$ in the adjoining compartment 46.

Similarly, the secondary fountain 39 also resembles a rectangular box having no top or bottom, and is provided along the bottom edge with rubber stripping 50 shown to act as squeegees as indicated in Fig. 9 for confining or sealing off the content $M_3$ of the fountain against the surface of the secondary or second-stage template 37.

The templates 36 and 37 will now be described in greater detail as to their stage-wise function in producing the edible design, as well as in regard to their structural details defining an example of the edible design itself.

The primary template 36 comprises a plate of suitable thickness, namely the thickness of the design portion to be produced by it. This template defines the first portion or stage of a design for example by having openings $r_1$ and $r_2$ registering with openings $O_1$ and $O_2$ of the plate 44. The fountain 38 passing over the openings $r_1$ fills the same sufficiently with paste material $M_1$ to cause the strip S' to sag or bulge slightly into the registering opening $O_1$ below as is indicated by the slight downward convexity 51. A portion of the material $M_1$ remains in the opening $O_1$ flush with the top face of the template after the fountain has been moved past it, which portion eventually in adhering to the strip constitutes a component portion $P_1$ of the design to be serially produced on the strip.

Similarly the contrastingly colored material $M_2$ from compartment 46 fills the template opening $O_2$ with a portion $M_2$ which eventually constitutes a component portion $P_2$ of the design.

The secondary template 37 is composed of a pair of plates $37^a$ and $37^b$ each of suitable thickness in view of the thickness requirements of the component portions of the design, the upper plate $37^a$ being superimposed upon and fastened to the lower plate $37^b$. The lower plate $37^b$ has an opening $r_3$ somewhat larger in diameter as well as somewhat deeper than the opening $r_1$ of primary template 36, the opening $r_3$ being moreover blanked off by the upper plate $37^a$ to form in effect a recess in which the component portion $P_1$ of the design may lodge after it has been advanced with the strip from the first design-forming stage or section 34 to the second section 35.

The lower plate $37^b$ furthermore has an opening $r_4$ somewhat larger and deeper than the opening $r_2$ of the primary template 36, in which the component portion $P_2$ of the design may lodge after it has passed from the first to the second design-forming stage. In order to exemplify a variation or possibility in the formation of the design the opening $r_4$ is for example only partially, namely marginally blanked off inasmuch as the overlying plate has a hole $r_5$ concentric with but substantially smaller than the hole $r_4$ of the underlying plate $37^b$.

Therefore, the material $M_3$ from the fountain 39 may fill the opening $r_5$ and thus superimpose upon the component portion $P_2$ of the design a portion $P_3$ in the course of the second-stage formation of the design. By way of presenting still another possibility in the formation of the design the lower plate $37^b$ of the second-stage template 37 is shown to be provided with a hole $r_6$ registering with a hole $r_7$ of equal diameter provided in the upper plate $37^a$. Thus the material $M_3$ may fill the combined depth $d$ (see Fig. 12) of both these holes and thereby form a further component $P_4$ of the design.

It will thus be understood that a single operation of the applicator device or else single operating cycle of the machine will produce, for example, in the first design-forming stage such component portions as the one designated as $P_1$ of one color together with the portion $P_2$ of a second color, while in the following or second design-forming stage it will add to the portions $P_1$ and $P_2$ previously produced in the first stage the portions $P_3$ and $P_4$ of a third color.

There will now be described the drive mechanism which effects the up-and-down movement of the platen 18 as well as the feeding of the strip through the applicator stage E. This mechanism feeds the strip in step-wise fashion through the machine in synchronism with or suitably timed with respect to the movement of the platen.

Both the vertical reciprocating movement of the platen as well as the step-wise movement of the strip are controlled by the rotation of a master drive shaft 51 from which branch driving means impart the vertical movement to the platen and the step-wise progressive movement to the strip. The function of the mechanism is such that one complete revolution of the master drive shaft 51 produces a complete operating cycle of the machine in so far as that cycle comprises a one-step progress of the strip the length of the decalcomania to be produced, this progress coupled or synchronized with a single reciprocation of the platen 18. Between such operating cycles of the machine the operator manipulates the applicator device, that is, the twin fountain unit by sliding it once back and forth over the templates 36 and 37 to apply the design-forming edible material through the templates onto the strip.

Therefore, in order to insure that the shaft performs a single revolution at a time, it has its driving power transmitted to it from a motor 52 through a so-called one-revolution clutch indicated by a clutch unit 53. A chain-and-sprocket drive 54 is indicated for transmitting driving power from the motor 52 to the clutch unit 53. A similar chain-and-sprocket drive 55 is shown for transmitting the driving power from the clutch unit 53 to the master drive shaft. That is to say, the drive means for the shaft 51 operate in such a manner that the motor may run continuously while the operator may engage the clutch to allow the motor to effect just one revolution of the shaft 51, since a clutch of this kind will automatically disengage the driving power upon completion of one single revolution of the shaft. Thereafter the operator may at will re-engage the clutch in order to initiate another operating cycle, after he has imparted to the twin-fountain unit T a single reciprocation or single bank-and-forth movement over the templates 36 and 37 in order to supply to and through the templates the edible design-forming material prior to starting the machine on its new cycle.

The master drive shaft 51 has a crank 56 actuating a connecting rod 57 pivotally connected as at 58 to the stem 31 for vertically reciprocating the platen 18. The shaft 51 has fixed upon it a gear 59 meshing with a gear 60 unitary with a first or primary countershaft 61 journalled upon the machine frame 10. The gear 60 in turn meshes with a gear 62 which is unitary with a second or secondary countershaft 63 also journalled upon the machine frame 10. The gears 59, 60, 62 have equal pitch diameter so that each full revolution of the master drive shaft 51 produces simultaneously a full revolution of each of the countershafts 61 and 63.

The primary countershaft 61 has fixed upon it at its far end a sprocket 64 driving a chain 65 which drives a companion sprocket 66 which is unitary with and rotates the auxiliary friction feed roller 26. Similarly the secondary countershaft 63 is unitary with a sprocket 67 driving a chain 68 which in turn drives a companion sprocket 69 which is unitary with and rotates the auxiliary friction feed roller 13. Thus each full revolution of the master drive shaft 51 draws a predetermined length of strip S' from the supply roll 12 as well as an equal predetermined length of cover strip S" from the supply roll 25. The lengths of strip thus drawn from both supply rolls 12 and 25 equal the length of composite strip to be passed from the machine as a result of each operating cycle thereof and which is the length to be cut off the strip by the chopping knife $K_2$, to constitute the square portion or specimen of decalcomania to be produced by this machine.

The stepwise feeding effected by the auxiliary feed rolls in this manner of the strips from their supply rolls 12 and 25 must be distinguished from the measured and controlled stepwise feeding of the strips through the applicator stage E as effected by the main feed rollers 20 and 21. As will be presently explained the stepwise rotation of the main feed roler 20 from the master drive shaft is carefully timed in relation to the up-and-down movement of the platen 18 inasmuch as the loaded strip must be free from and released by the templates 36 and 37 before the strip is to be allowed to be advanced by the main feed roller 20. Yet, as will appear, the so timed stepwise rotation of the feed roller 20 is in effect rendered independent of the stepwise feed of the strips by the auxiliary driven feed rollers 13 and 26, since the compensating loops 13 and 29 with their respective floating rollers 17 and 28 absorb any differentials in feed rate or timing as between the driven main feed roller 20 and the driven auxiliary feed rollers 13 and 26. That is to say, the measured stepwise advance of the strip S' through the applicator stage E is effected by the main feed roller 20 which is therefore herein also termed the master feed roller, but this master roller is relieved by the driven auxiliary rollers 13 and 26 of the burden of having to accelerate the heavy supply rolls 12 and 25 each time the strips are to be drawn therefrom stepwise.

The measured or timed stepwise rotation of the master feed roller 20 is effected by the reciprocating movement of an inclined rod or gear rack 70 the lower end of which is connected with the crank pin of a crank 71 provided upon the master drive shaft 51 at the far end thereof (see Fig. 2). Downwardly disposed gear teeth 72 are formed at the underside of the drive rod 70 and at the upper end thereof which teeth mesh with a gear 73 which is loose upon the shaft $20^a$ of master feed roller 20 although coupled therewith as through a pawl-and-ratchet device V (see detail Fig. 3) to effect one-way stepwise rotation of the feed roller 20 in the direction of arrow $W_7$ as the drive rod 51 reciprocates with each rotation of the master drive shaft 51. Consequently the device V comprises a ratchet wheel 74 fixed upon the main feed roller shaft 20ᵃ and a pawl 75 swingably mounted upon one side of gear 73 and urged into engagement with the ratchet by a flat spring 76 also anchored upon the side of the gear 73. A guide roller 77 mounted upon the machine frame engages the top side of the drive rod 70 to insure meshing engagement between the teeth 72 of the drive rod with those of gear 73.

Because of the pawl-and-ratchet device V the drive rod 70 by its reciprocating movement (indicated by arrow W⁸) imparts one-way stepwise rotation to the master feed roller 20. That is, the rod is effective to drive during its upstroke but idles during its return stroke, the amount of stepwise rotation thus imparted to the roller 20 being tantamount to the desired advance of the strip S' through the applicator stage E which in turn is tantamount to the simultaneous stepwise advance of the composite strip C.

The shaft 20ᵃ of master feed roller 20 also has fixed upon its far end (see Fig. 2) a sprocket 78 which drives a chain 78ᵃ which in turn drives a companion sprocket 79 that is unitary with the feed roller 23 through the shaft 23ᵃ thereof. The feed rollers 20 and 23 are of equal diameter so that the straight length R (see Fig. 1) of the composite strip is maintained between these rollers, allowing the splitting knife K₁ to be disposed and to operate within the space R.

Actuating means for effecting the up-and-down movement of the chopping knife K₂ are diagrammatically indicated by a foot pedal 80 fixed on a shaft 81 rotatably mounted on the machine frame and having an actuating connection with the knife K₂ indicated at 82.

An embodiment of an ornamental unit of three-dimensional decalcomania exemplifying the "overlay" composition of component portions of edible material is shown in Fig. 14 illustrating the product derived by the operation of the machine as shown in Figs. 1 to 13. Hence, there can be discerned in the product of Fig. 14 the backing strip or sheet S', the transfer strip S'', as well as the gelatinous or non-crystallizable component portions P₁, P₂, P₃, and P₄, the portions P₂ and P₃ representing an example of "overlay." Fig. 14 also shows the protective backing strip S' in the process of being removed or peeled off as by fingers F₁ and F₂ indicating that adhesion between the edible material and the transfer sheet S'' is greater than adhesion between the material and the backing strip S'.

After the backing sheet S' has been removed exposing the underside of the design, the unit may be applied to adhere to a layer of icing 83 of a cake 84 whereupon the transfer sheet S'' may be peeled off as indicated by fingers F₃ and F₄ leaving upon the cake the finished decorative design portions P₁, P₂, P₃, and P₄ as shown in Fig. 16.

In Fig. 17 there are to be discerned parts of the applicator station E comprising the applicator device 19 and the platen 18 as shown in Figs. 4 to 7 of the machine. That is, Fig. 17 indicates the applicator device 19 as by its frame 33 as well as by showing portions of a twin fountain T' which differs somewhat as to its compartmentation but not as to general function from the twin fountain T of Figs. 2 and 10. The Fig. 17 form of the twin fountain provides a first stage section 85 and a second stage section 86 of the slidable twin fountain, in this instance neither one of these sections being any further sub-divided. The bottom edge of fountain section 85 has squeegees 85ᵃ of rubber or the like sealing it against a template 87. The fountain section 86 has similar squeegees 86ᵃ sealing it against a template 88. A transfer strip 89 in this embodiment being of acetate or similar film-like and preferably transparent material is shown to be in contact with the templates 87 and 88, the strip being confined between the templates and the platen 18.

The fountain section 85 contains edible material M₄ of the non-crystallizing gelatinous kind, while the fountain section 86 contains edible material M₅ of the crystallizable or sugary kind.

The template 87 in this example has a central heart-shaped opening 90 surrounded by small openings 91, and is of the thickness $d_4$. This template produces the primary or inlay portions P₅ and P₆. The transfer sheet 89 bearing the primary portion of the design then moves into the secondary stage in the direction of arrow W₁₀ upon the platen 18 in the manner previously described. Material M₅ is then superimposed as a secondary shaped layer or portion P₇ upon and encompasses the primary or inlay portion of the design by filling an opening 92 provided in template 88 which template is of a thickness $d_5$ greater than the thickness $d_4$ of template 87. Consequently after the transfer strip 89 has moved a further step through the applicator device it carries on it the completed "monolithic" design 93 in face down position to a point past and clear of the applicator device. The outer contour of the second layer P₇ in this example conforms substantially to the general heart-shaped contour of the first layer or inlay portion P₅ but is of contrasting color relative to the inlay portions P₅ and P₆. For example the inlay portions may be red while the surrounding secondary portion may be of a light color furnishing the contrasting background for the inlay portion.

Thus a completed ornamental unit of the "monolithic" kind is shown in Fig. 18 right-side-up and ready for application to a cake. This unit is then, while the crystallizable second layer P₇ is still soft enough (see Fig. 19), applied to a cake 94 with sufficient firmness of pressure to cause it to adhere to the cake, whereupon the acetate transfer sheet 89 may be pulled or peeled off as indicated by fingers F₅ and F₆ and also illustrated in the top view of Fig. 20, leaving the finished ornament upon the cake as shown in Fig. 21.

*Operation*

The actuating mechanism is such that each operating cycle of the machine in producing a finished design or finished specimen of the decalcomania advances the strip a distance equivalent to the predetermined length of the specimen of decalcomania to be cut off the strip by the chopping knife K₂ at the delivery end of the machine. The extent of the stepwise feed or length of the finished decalcomania is designated as H in Figs. 11, 12, and 13.

The operation of the machine is illustrated by characteristic phases of an operating cycle as represented by the diagrammatic Figs. 4, 5, 6, and 7 to be considered in conjunction with various operating positions of the platen relative to the applicator device as represented in the detail Figs. 10, 11, 12, and 13.

Fig. 4 represents the start of the operating cycle showing the actuating mechanism arrested at a point where it places the platen in its topmost template-engaging position due to the then upper dead center position of the crank 56. This corresponds to the Fig. 10 position of the platen 18 relative to the stationary applicator device 19. At this time the operator of the machine applies the edible materials $M_1$, $M_2$, and $M_3$ simultaneously to the first and the second stage templates 36 and 37 by sliding the fountain unit T upon and along the full length of the applicator frame 33, that is in a direction transversely of the strip S'. This done the operator engages the one-revolution clutch 53 as by some suitable foot pedal actuated mechanism (not shown) while motor 52 keeps running. This starts the master shaft 51 rotating so as to lower the platen 18 a distance $d_1$ (see Fig. 5) that is a portion of its complete stroke. Coincident with this partial downward movement of the platen from its Fig. 4 to its Fig. 5 position the push-rod 70 is withdrawn in the direction of arrow $W_{10}$ idly so that the strip S' remains stationary. This means that from the starting of the cycle up to this point the feeding or advancing of the strip S' is delayed due to the main feed roller up to this point being left idle. Thus the Fig. 5 position represents the strip with the raised edible design thereon as having been fully freed or disengaged from the templates of the applicator device so that now the advance of the strip can begin. Therefore, this Fig. 5 condition of the machine may be said to correspond to the Fig. 11 detail showing of the platen and applicator device illustrating the fact that the raised design, namely the portions $P_1$, $P_2$, $P_3$, and $P_4$ thereof are now free and clear of the templates 36 and 37.

As the master shaft 51 continues its rotation it completes the downward stroke of the platen 18 when crank 56 reaches its lower dead center position shown in Fig. 6 in which position the platen 18 is lowered the distance $d_2$ from the templates of the applicator device 19.

Further rotation of the master shaft 51 starts the platen on its upward return stroke an intermediate position of which is shown in Fig. 7 which may be said to correspond to the Fig. 12 position of the parts that is the position of the platen relative to the applicator device. This Fig. 7 position substantially corresponds to the intermediate downstroke position of the Fig. 5, that is the intermediate distance $d_1$ of Fig. 5 substantially corresponds to the intermediate distance $d_3$ of Fig. 7.

In concluding a single revolution and thereby concluding an operating cycle the shaft 51 moves the platen from its Fig. 7 position to its Fig. 4 starting position where it is automatically stopped by the one-revolution clutch device 53.

It should be understood that in this presentation of the operation of the machine the extent of movement or stroke of the platen 18, that is the distance $d_2$, has been greatly exaggerated to afford greater clarity in the analysis of the various operating cycles. In a practical embodiment of this machine the functional coordination of the parts was such that a platen stroke of about ½" sufficed to allow the desired progress or feed of the strip S' to take place within the allotted phase of the operating cycle. It will now be seen that the portion of the operating cycle that lies between the Fig. 5 and the Fig. 6 position of the mechanism is made available and indeed is being utilized for allowing the mechanism to advance the strip the allotted distance H indicated in Figs. 11, 12, and 13. In other words the horizontal advance of the strip over the platen 18 by the mechanism is coordinated to the vertical movement of the platen in such a manner that the advance takes place while the strip with the raised design is sufficiently spaced downwardly from and clear of the templates 36 and 37. In this connection it will be noted that in the Fig. 5 position of the parts the platen 18 and its crank 56 have reached an intermediate position as the crank 71 having retracted the push-rod 70 idly (because of the idling of the ratchet device of Fig. 3) reaches a lower dead center position where it is just about to start the push-rod 70 on its upward active stroke to rotate the master feed roller 20. The arrangement and dimensioning of the parts is such that in moving from the Fig. 5 position to the Fig. 7 position the feed roller 20 will have advanced the strip the allotted step H. In other words during that phase of the cycle the first-stage or primary component portions $P_1$ and $P_2$ (see Fig. 11) of the raised design will have been advanced to the Fig. 12- or second-stage position while the second stage or final design comprising the portions $P_1$, $P_2$, $P_3$, and $P_4$ will have advanced to a position past the applicator stage. This advance will have been completed when the crank 71 of push rod 70 in Fig. 7 reaches its upper dead center position where the push rod 70 is about to be again retracted idly. During the now following balance of the operating cycle the crank 56 raises the platen 18 from its intermediate (Fig. 7 and Fig. 12) position to the starting position of Fig. 4 and Fig. 13 where the strip again engages the templates 36 and 37 facewise as the portions $P_1$ and $P_2$ enter into and lodge in the protective cavities $r_3$ and $r_4$. Here the movement of the mechanism stops terminating the operating cycle.

With the parts in the Fig. 13 position the operator will now move the twin fountain unit T back and forth upon the applicator frame 33 in the process of refilling the design defining openings $r_1$ and $r_2$ of the primary template 36 simultaneously with refilling the design-defining openings $r_5$, $r_6$, and $r_7$ of the secondary template 37. This done the condition of Fig. 4 and Fig. 10 will have been re-attained whereupon a new operating cycle may be initiated. It will be understood that after the completion of each operating cycle the foot pedal 80 is to be actuated in order to sever a finished specimen or unit of decalcomania from the strip.

The diagrammatic Figs. 4 to 7 show a main feed roller 20 of greater diameter than the associated feed roller 23 but they nevertheless have equal circumferential velocity due to the proper choice of motion-transmitting ratio whereby the chain 78 drives the roller 23 at a relatively greater rotation speed than that of roller 20. Thus there is maintained the straight length R of the composite strip allowing the knives $K_1$ to slit the strip as the same is being discharged from the machine. While the stepwise rotation of the main or master feed roller 20 is carefully timed to advance the strip relative to the platen a predetermined distance within the allotted phase or portion of the operating cycle, the branch drives or chains 66 and 68 rotate the auxiliary feed rollers 13 and 26 uniformly throughout the full cycle. In this way a predetermined length of strip substantially corresponding to the length H is drawn simultaneously from each of the supply rolls 10 and 25 to provide reserve length in the accompensating loops 16 and 29. Any differentials of feed rate between the main feed roller 20 and the auxiliary feed rollers 13 and 26 are absorbed by the compensating loops 16 and 29 as is indicated between varying positions (see Fig. 1) of the respective floating rollers 17 and 28.

I claim:

1. Apparatus for producing an edible raised design upon a backing sheet comprising a machine frame, a horizontally-extending flat platen in the nature of a suction box mounted upon said frame for vertically reciprocating movement between an upper and a lower position, said platen being adapted to support upon and to hold by suction to the top face of the platen a backing strip being fed in step-wise advance over the platen, horizontally-extending template means defining the edible design mounted fixedly with respect to said frame and above said platen, said template means comprising a first plate member defining one component of the design, and a second plate member defining another component of the design, supply means for applying the edible material to and into the design-forming space defined by each plate member together with the platen when the platen with the strip is in its upper template-engaging position, and main strip-feeding means for advancing the strip over the platen while the platen with the strip is in a sufficiently lowered position.

2. A machine according to claim 1, in which the supply means comprise a supply fountain disposed above and coactive with said template means and having a downward discharge mouth adjacent to the upper face of the template means and provided with an edge of resilient material for sealing said mouth against the face of the template means when moved horizontally in contact therewith, and horizontal guide means for so moving the fountain in a direction transversely of the feed direction of the strip for filling the template with the edible material.

3. Apparatus according to claim 1, in which the second plate member has its underside recessed so as to constitute cavities disposed for allowing said first component of the design to lodge therein, a second component of the design being produced through said second plate member.

4. Apparatus according to claim 1, with the addition of branch drive means for said strip-feeding means, branch drive means for reciprocating said platen, and master drive means for driving both said branch drive means in such timed relationship to each other that the backing strip is advanced at a time when the design formed thereon is lowered from and clear of the template means.

5. Apparatus according to claim 1, with the addition of a supply roll rotatably mounted upon said frame from which roll said backing strip is drawn, roller means for forming a compensating depending loop of said strip between said supply roll and said platen comprising a floating roller weighting said loop, and auxiliary feeding means coupled with said main feeding means for drawing said backing strip from said supply roll at a rate maintaining said loop at desired length.

6. Apparatus according to claim 1, in which said main feeding means comprises a driven feed roller coactive with an idler, with the addition of a first supply roll rotatably mounted upon said frame from which said backing strip is drawn, first roller means for forming between said supply roll and said platen a first compensating depending loop of said backing strip comprising a floating roller weighting said loop, first auxiliary feeding means for drawing said backing strip from said first supply roll at a rate maintaining said loop at desired lengths, a second supply roll of cover strip also rotatably mounted upon said frame, second roller means for forming between said second supply roll and said main feeding means a second compensating depending loop of said cover strip comprising a second floating roller weighting said second loop, second auxiliary feeding means for drawing cover strip from said second roll at a rate maintaining said second loop at desired lengths, a master drive shaft, a first countershaft parallel to and driven by said master shaft, motion transmitting means for driving the one of said auxiliary feeding means by said first countershaft, a second countershaft driven by said master drive shaft, motion transmitting means for driving the other of said auxiliary feeding means by said master drive shaft, a drive rod having eccentric driving connection with said mastershaft for imparting reciprocating movement to and having one-way driving connection with said driven feed roller of the main feeding means for imparting stepwise rotation thereto.

7. Apparatus according to claim 1, in which said main feeding means comprises a driven feed roller coactive with an idler, with the addition of a first supply roll rotatably mounted upon said frame from which said backing strip is drawn, first roller means for forming between said supply roll and said platen a first compensating depending loop of said backing strip comprising a floating roller weighting said loop, first auxiliary feeding means for drawing said backing strip from said first supply roll at a rate maintaining said loop at desired lengths, a second supply roll of cover strip also rotatably mounted upon said frame, second roller means for forming between said second supply roll and said main feeding means a second compensating depending loop of said cover strip comprising a second floating roller weighting said second loop, second auxiliary feeding means for drawing cover strip from said second roll at a rate maintaining said second loop at desired lengths, a master drive shaft, a first countershaft parallel to and driven by said master shaft, motion transmitting means for driving the one of said auxiliary feeding means by said first countershaft, a second countershaft driven by said master drive shaft, motion transmitting means for driving the other of said auxiliary feeding means by said master drive shaft, a drive rod having eccentric driving connection with said mastershaft for imparting reciprocating movement to and having one-way driving connection with said driven feed roller of the main feeding means for imparting stepwise rotation thereto, a motor for driving said mastershaft, and an automatically stopping clutch device for imparting to the mastershaft a predetermined degree of rotation for effecting the measured advance of the strips toegther to the extent of the desired length of the decalcomania.

8. Apparatus according to claim 1, in which said main feeding means comprises a driven feed roller coactive with an idler, with the addition of a first supply roll rotatably mounted upon said frame from which said backing strip is drawn, first roller means for forming between said supply roll and said platen a first compensating depending loop of said backing strip comprising a floating roller weighting said loop, first auxiliary feeding means for drawing said backing strip from said first supply roll at a rate maintaining said loop at desired lengths, a second supply roll of cover strip also rotatably mounted upon said frame, second roller means for forming between said second supply roll and said main feeding means a second compensating depending loop of said cover strip comprising a second floating roller weighting said second loop, second auxiliary feeding means for drawing cover strip from said second roll at a rate maintaining said second loop at desired lengths, a master drive shaft, a first countershaft parallel to and driven by said master shaft, motion-transmitting means for driving the one of said auxiliary feeding means by said first countershaft, a second countershaft driven by said master drive shaft, motion-transmitting means for driving the other of said auxiliary feeding means by said master drive shaft, a drive rod having eccentric driving connection with said mastershaft for imparting reciprocating movement to and having one-way driving connection with said driven feed roller of the main feeding means for imparting stepwise rotation thereto, third auxiliary roller feeding means for said joined strips spaced from said second auxiliary feeding means in the direction of advance of said strips, and drive means for said third roller feeding means coupled with said second roller feeding means for maintaining a substantially straight length of said joined strips, and a knife mounted on said machine frame for slitting said straight length of strip.

CARL EGARD SEAGREN.

REFERENCES CITED

The following references are of record in the file of this patent:

UNITED STATES PATENTS

| Number | Name | Date |
|---|---|---|
| 537,923 | Huldyard | Apr. 23, 1895 |
| 1,235,805 | Jennings, Jr. | Aug. 7, 1917 |
| 1,411,789 | Kellogg | Apr. 4, 1922 |
| 1,460,825 | Peters et al. | July 3, 1923 |
| 1,585,114 | Randolin | May 18, 1926 |
| 1,627,630 | Carter | May 10, 1927 |
| 1,941,597 | Cavagnaro | Jan. 2, 1934 |
| 1,960,997 | Halloran | May 29, 1934 |
| 1,989,702 | Leguillon | Feb. 5, 1935 |
| 2,037,091 | Rosenthal | Apr. 14, 1936 |
| 2,094,886 | Hart | Oct. 5, 1937 |
| 2,129,163 | Schneider | Sept. 6, 1938 |
| 2,239,619 | Murgatroyd et al. | Apr. 22, 1941 |
| 2,353,594 | Seagren | July 11, 1944 |
| 2,359,825 | Campbell | Oct. 10, 1944 |
| 2,465,927 | Rapp | Mar. 29, 1949 |